US008627453B2

(12) United States Patent
Flowers et al.

(10) Patent No.: US 8,627,453 B2
(45) Date of Patent: Jan. 7, 2014

(54) METHOD AND APPARATUS FOR MANAGING MULTIPLE SECURITY PROTOCOLS AND USERS FOR IMAGING DEVICES

(75) Inventors: William G. Flowers, Lexington, KY (US); Stephen D. Skubik-Peplaski, Lexington, KY (US); Steven L. Duncan, Lexington, KY (US); Evan G. Goldey, Lexington, KY (US); Stacey K. Gordon, Lexington, KY (US); Charles E. Grieshaber, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 1280 days.

(21) Appl. No.: 11/964,297

(22) Filed: Dec. 26, 2007

(65) Prior Publication Data

US 2009/0172807 A1 Jul. 2, 2009

(51) Int. Cl.
*G06F 7/04* (2006.01)
(52) U.S. Cl.
USPC .......................................................... 726/17
(58) Field of Classification Search
USPC ........................... 726/2, 4, 5, 17, 27; 713/183
See application file for complete search history.

(56) References Cited

U.S. PATENT DOCUMENTS

| 7,478,421 | B2 * | 1/2009 | Kodimer et al. | 726/4 |
|---|---|---|---|---|
| 7,890,998 | B2 * | 2/2011 | Lu et al. | 726/21 |
| 2003/0231327 | A1 * | 12/2003 | Ashey et al. | 358/1.13 |
| 2008/0106754 | A1 * | 5/2008 | Oomori | 358/1.15 |

* cited by examiner

*Primary Examiner* — Beemnet Dada

(57) ABSTRACT

Methods and apparatus contemplate a system for securing imaging devices on a network by allowing a system administrator to apply different security protocols to specific functions of an imaging device. This allows a system administrator to customize the functions of the imaging device by restricting the particular functions to only those users who need them, as opposed to the global security policies currently required. The system uses a computer program product, including executable instructions, which can be stored on the imaging device itself, a network server, and/or some other device attached to the network. The computer program product can be installed directly from the manufacturer, through computer readable media, or by downloading. The product interfaces directly with the imaging device to determine what imaging functions are present and to set what security protocols are required to access those functions.

17 Claims, 17 Drawing Sheets

Authentication/authorization setup

Building Blocks — 700

The 'Building Blocks' are the various methods that can be used to restrict access. Complete these first. Some methods can be used in combination with each other, so the next step is to select from the completed Building Blocks to assemble Security Templates. Security Templates represent specific ways to protect functions or menus.
Finally, select a Security Template for each protectable area.

Create Building Blocks

Set up the methods of authentication/authorization that will be used — 710

Internal Accounts
NTLM
Kerberos 5
LDAP
LDAP+GSSAPI
PIN
Password
Custom/eSF

Assemble Security Templates — 720

Use available Building Blocks to create specific templates for controlling access
Create Security Templates

Apply Templates to Access Controls — 730

Choose from available templates to control access to specific functions or menus (including disabling functions entirely)
Apply Security Templates to Access Controls

Manage LDAP+GSSAPI servers  /800

( Add an LDAP+gssapi setup )————810

To modify an existing LDAP setup, click on the Setup Name in the table below.

To copy an existing LDAP setup, click on the Setup Name in the table below, then change the Setup Name and submit the change.

Existing LDAP setups   /820

| Setup Name | Server Address | Test connection |
|---|---|---|
| LexmarkCorp | directory.lex.lexmark.com | ( Test LDAP Authentication Setup ) |

Fig. 9

LDAP+GSSAPI server setup 900

General Information

| | | |
|---|---|---|
| Setup Name | | 910 — Required. This name will be used to identify this particular LDAP Server Setup when creating Security Templates. |
| Server Address | | |
| Server Port | 389 | Default: 389. — 920 |
| Use SSL/TLS | ☐ | |
| LDAP Certificate Verification | Demand | 930 |

LDAP Group Names

If you plan to restrict access to specific groups, enter identifiers for those groups (such as the group's cn, the Common Name). Up to 32 groups may be associated with this setup.

When creating Security Templates you will be able to pick specific groups from this setup for restricting access.

| Short name for group | Group identifier |
|---|---|
| Group 1 | ENGINEER |
| Group 2 | MARKETING |
| Group 3 | |
| Group 4 | |
| Group 5 | |
| Group 6 | |
| Group 7 | |
| Group 8 | |

Password Setup ──────1000

When an access control is set to a password that is not an Admin Password, any Admin Password on the device will be valid for that access control.

Name                                    ─1010

Please type the new password in twice. Submit blank fields to remove the password.                              ─1020

Password                              Range: 8 - 127 characters

Re-enter password                     Range: 8 - 127 characters

Admin Password                        ─1030

─1040

Submit  Cancel

Security Templates

|  |  | 1200 |
|---|---|---|
| Security Template Name | KnowledgeNetForNOC | |
| Authentication Setup | LexmarkCorp  1210 | |
| Authorization Setup | [ None ⇕ ] | Authorization restricts access based upon groups. Groups must be set for access to be granted. |

( Set groups ) —1220

( Save template )  ( Cancel )
　　1230　　　　1240

Fig. 13

Security Templates

1300

Security Template Name: KnowledgeNetForNOC

Authentication Setup: LexmarkCorp

Authorization Setup: NOCGroup

Groups that are authorized with this template:

```
admin
lpdev
noc
ENGINEER
Marketing
```
— 1310

1320

(Save template) (Cancel) —— 1330

Fig. 14

Apply Templates to Access Controls  1400

Choose a Security Template to protect each function.

Functions which can be disabled have a 'Disabled' selection. To let anyone use the function, choose 'No Security'.

| Function | Template |
|---|---|
| Security Menu at the device | UsersInNOC |
| Security Menu remotely | UsersInNOC — 1420 |
| Lock operator panel | DeviceAdmins — 1450 |
| Supplies Menu at the device | No Security |
| Supplies Menu remotely | No Security |
| Paper Menu at the device | No Security — 1430 |
| Paper Menu remotely | No Security |
| Reports Menu at the device | No Security |
| Reports Menu remotely | No Security |
| Settings Menu at the device | No Security |
| Settings Menu remotely | No Security |
| Network/Ports Menu at the device | No Security |
| Network/Ports Menu remotely | No Security |
| Supplies Menu at the device | No Security |
| Supplies Menu remotely | No Security |
| Manage Shortcuts at the device | No Security |
| Manage Shortcuts remotely | No Security |
| Create Scan Back Profile | No Security |
| Create Network TWAIN Profile | No Security |
| Create LDD Profile | No Security |
| Change language from Home screen | Disabled — 1440 |
| Copy Function | No Security |

1410

METHOD AND APPARATUS FOR MANAGING MULTIPLE SECURITY PROTOCOLS AND USERS FOR IMAGING DEVICES

FIELD OF THE INVENTION

Generally, the present invention relates to imaging devices, such as laser printers, copy machines, scanners, fax machines, inkjet printers, all-in-ones, etc. Particularly, it relates to managing user security in conjunction with different functions of imaging devices. In one aspect, a network's system administrator can complete this process through a wizard. In another, existing security measures can be added to the system. Other noteworthy features include the ability to test the security measures and the ability to customize which individual functions of the imaging devices are protected by the different security protocols. Various computing environments are also disclosed.

BACKGROUND OF THE INVENTION

Security is an increasingly important element in twenty-first century office environments. This increased focus has lead to multiple security protocols for both transporting data securely and for forcing users of technological devices to identify themselves in some way for the purpose of authenticating or authorizing them to use the device.

In the imaging device industry, the first explorations into security largely involved requiring a password to change the imaging device's configuration. Later, protocols such as the Lightweight Directory Access Protocol (LDAP) were developed to allow control over the actions of any individual workstation on a network. The imaging device industry adopted many of these protocols for securing imaging device operation.

However, these protocols have been global in nature, as they provide blanket coverage for a device, either every function of an imaging device requires a particular security protocol or no function does. Additionally, these protocols often require information to be entered at the imaging device that many older imaging devices are not capable of providing, such as character entry. This has allowed many simpler security methods, such as Personal Identification Numbers (PIN) to survive, as many older imaging devices contained number pads. As a result, imaging devices are often either under-secured, with a global PIN number to protect every feature, or over-secured, requiring complex passwords for even basic functions.

Accordingly, a need exists in the art of imaging devices to customize the manner in which these devices can be secured, as both imaging devices and security protocols have grown more complex and provide more features than ever before. Administrators should be able to loosely secure basic functions of an imaging device while providing meaningful security for the more cost-sensitive functions of imaging devices. Naturally, any improvements along such lines should further contemplate good engineering practices, such as relative inexpensiveness, stability, ease of implementation, low complexity, unobtrusiveness, etc.

SUMMARY OF THE INVENTION

The above-mentioned and other problems become solved by applying the principles and teachings associated with the hereinafter-described method and apparatus for managing multiple security protocols and users for imaging devices. In a basic sense, system administrators are provided with an easy to use, single access point to create, edit, and test any number of security methods for any or all users of imaging devices on a particular computer network.

In a representative embodiment, a computer program product (available as a download, on a computer readable media, as firmware, as prescribed functionality amongst chips, microprocessors, ASIC(s), etc.) is installed for use with an imaging device, which is connected to a computer network. In such instances, the imaging device also connects to a web server; including hosting the program product on either or both of the imaging device or server, and/or any other connected computing devices, such as a user workstation. An administrator for the computer network remotely accesses the program product through the network and configures any security protocols which are deemed necessary to protect the functions of the connected imaging device. Also, a graphical user interface is provided for the configuration of security protocols. Information necessary for a particular security protocol is entered, and then the imaging device is configured to operate with said protocol. Thereafter, network users use the functionality of the imaging device.

During use, the computer program product receives requests for access to individual functions of the imaging device. It is then determined whether requested function requires authorization, and if so, what type. Gathering of information includes prompting the user at his or her workstation, prompting the user at the imaging device, or by any other conceivable method, depending on the function requested. Once the authorization information is secured, it is determined whether such allows the user to access a desired imaging function (such as color printing, single-sided printing, use of paper type, or any host of conceivable imaging functions well known or later developed in the art). In one aspect, this occurs by querying resident information of locally/remotely stored records or by requesting the assistance of another program to verify the authorization information. If the authorization information is valid, the desired imaging function is initiated. If not, an entirety of imaging is prevented or a host of default options are made available.

The imaging device includes a controller, such as a microprocessor(s), ASIC(s), and/or a variety of chips, discrete components, etc. With the computer program product installed on the imaging device's controller, the individual device's functions can be more efficiently managed. Various computing environments are also disclosed.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 7 through 14 are a series of screenshot views in accordance with the teachings of the present invention showing one possible implementation of managing the security protocols.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, method and apparatus for managing multiple security protocols and users for imaging devices are hereinafter described.

Preliminarily, the terms authentication, authorization and security template are variously used herein according to the following:

Authentication, widely used in current art, is the retrieval of user credentials (PIN, password, user name and password combination, fingerprint, etc.) and checking to see if they are valid in that they are verified through the security protocol in use.

Authorization requires a successful authentication, and then further restricts access based upon the group or other membership of the authenticated user. The security protocol maintains a list of group or other memberships for each user, and the security template maintains a list of groups, membership in one of which is necessary for access to a function protected by that template.

A security template is a method for protecting a function. A security template has, at the very least, a defined security protocol for authentication. A security template, in addition to the security protocol for authentication, may also define a security protocol for authorization, which would include both the type of security protocol and a list of groups to be used to restrict access.

Figure 1:
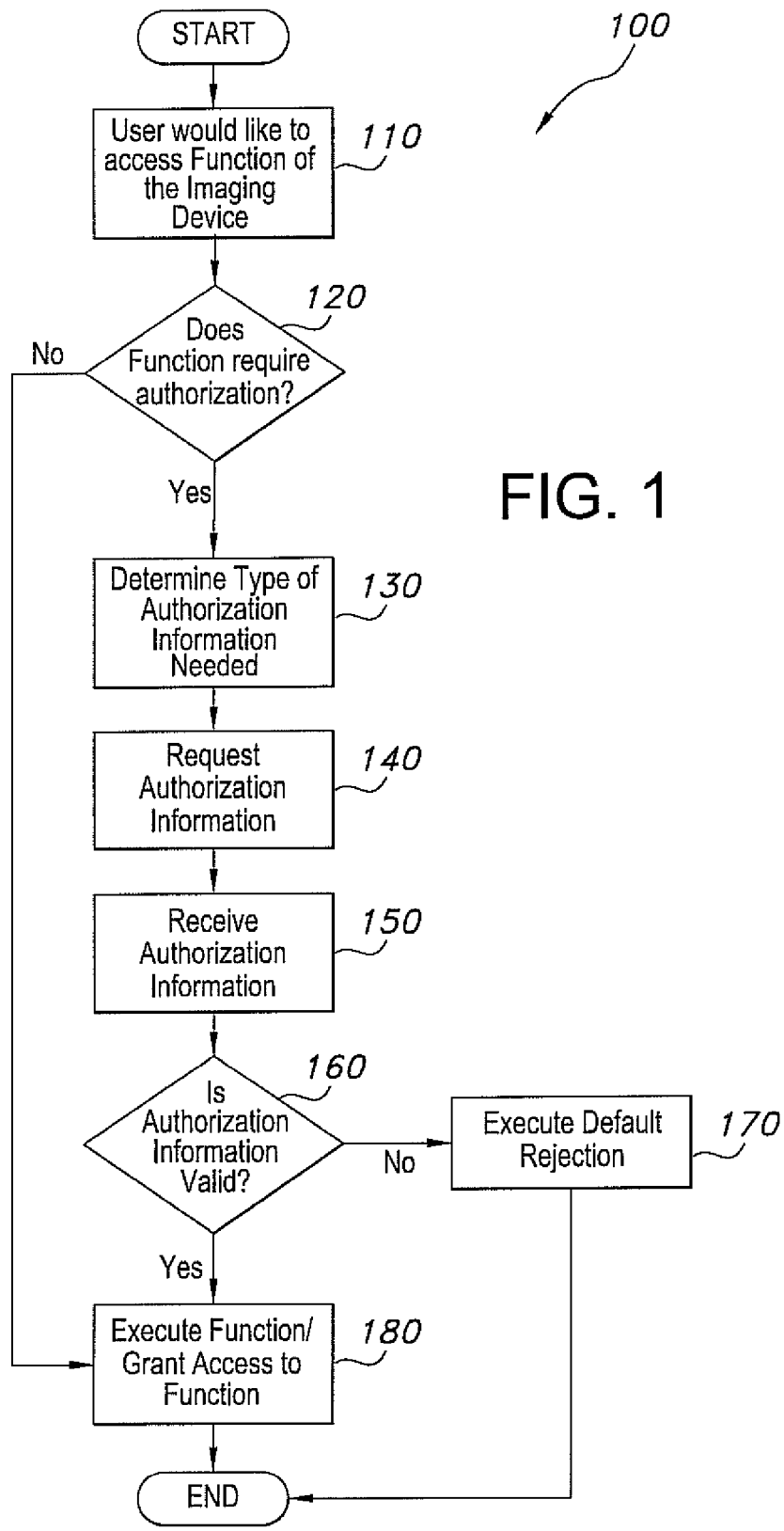
FIG. 1 is a flow chart in accordance with the teachings of the present invention of a request to access a function of an imaging device.

With reference to FIG. 1, the logical steps taken by a computer program product for an imaging device are given generically as 100. A program, generically, is a series of computer executable instructions that can be made available through means such as a computer readable medium, such as a compact disc, or through download, and may reside in hardware, firmware or other computer devices. Also, an imaging device could be represented by a laser printer, copy machine, scanner, fax machine, inkjet printer, all-in-one (seen in FIG. 5), etc. or many other devices. Imaging functions would therefore include, but not be limited to, activities such as color printing, making multiple copies, sending a fax, scanning in color, watermarking, stapling, arranging color palettes, duplexing, or any other conceivable imaging function already well known or later developed in the art. In any event, a user then requests access to use one or more of these functions at step 110.

At step 120, it is determined whether any authorization is required to undertake the imaging function. If no authorization is required, the logic proceeds to step 180 whereby the imaging function is executed or otherwise access is granted to the functionality requested by the user, as necessary. If, on the other hand, authorization is indeed required per a particular function or group of functions at step 120, such as set forth per an enterprise policy, a configuration established by a system administrator, a configuration established by a workgroup of the enterprise, etc., a particular type of authorization is then determined at step 130. For this, it is determined whether the user needs to enter a pin, a password, or other credential, whether they need to scan an employee card, a smart card, connect a certain memory device, etc., whether they need to cause entry of biometric information, such as scanning a fingerprint, retina, or the like, or entering some combination of the foregoing or other security or designated information. Regardless, step 140 contemplates the request of the authorization information and, upon user entry, it is received by the imaging device at step 150. Types of user entry include, but are not limited to, entering information on an entry panel (FIG. 4) directly at the imaging device itself (FIG. 5) or at the user's workstation, depending on how the program is configured. It may be also scanned via a reader, scanner, or other appropriate device that could be either connected or integrated with the imaging device.

In any event, step 160 contemplates the assessment of whether the authorization information is valid. As before, such can occur by querying locally/remotely stored records, including querying user credentials, user workgroups, enterprise policy, or the like, or by seeking assistance the program's internal records. In any event, if the information is not valid, logic dictates the prohibiting of imaging in any form or execution of a limited number of default rejections at step 170. As contemplated herein, a default rejection is a process that the administrator sets for instances when a user fails to properly be authorized. Representatively, this includes, but is not limited to, re-prompting the user for authorization information, returning the user to the start screen, providing limited imaging function, such as black and white, less than 10 pages, no long distance faxing, or the like. Otherwise, logic proceeds to step 180 whereby full functionality is obtained.

Figures 2A, 2B:
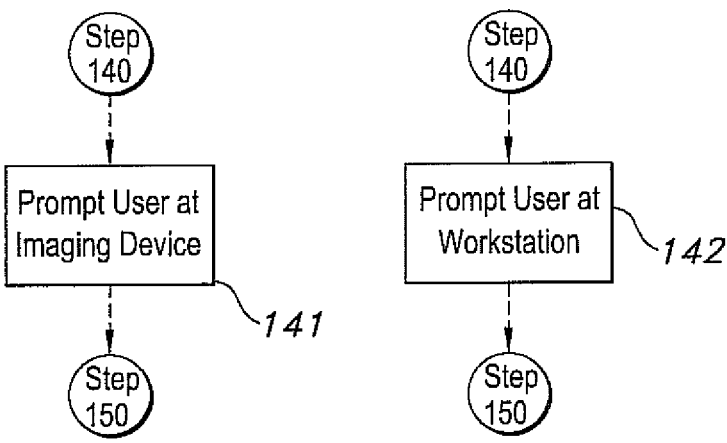
FIGS. 2A, 2B, and 2C are flow charts in accordance with the teachings of the present invention for requesting authorization information from the user of an imaging device.
Figure 2C:
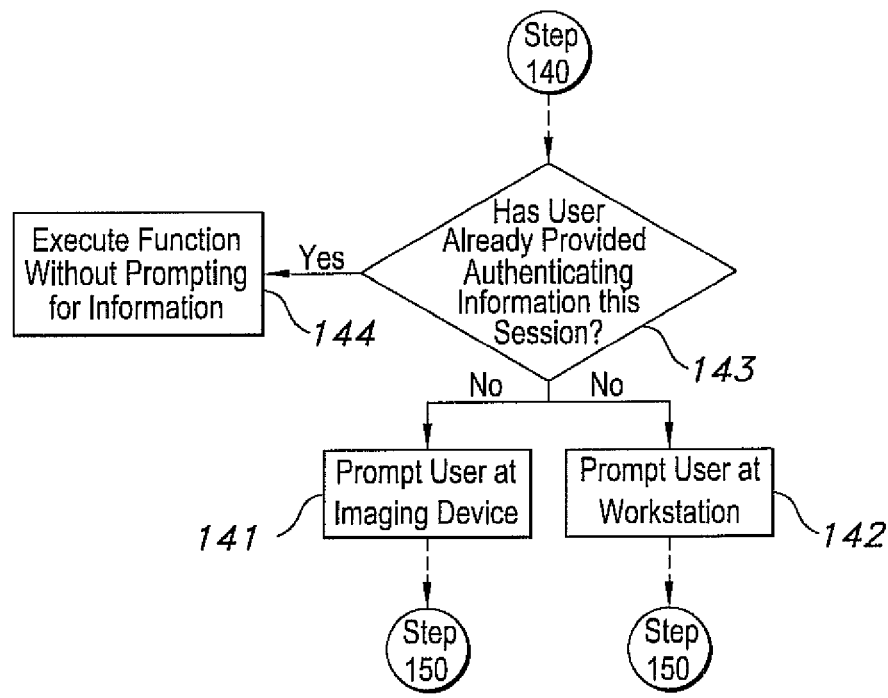

With reference to FIGS. 2A, 2B, and 2C, certain methods for requesting authorization information from the user are shown per step 140 of FIG. 1. For instance, FIG. 2A teaches prompting the user to enter authentication information at the imaging device, step 141, most likely through a screen and keypad attached to the imaging device. This scenario would most commonly be used for functions such as copying or faxing documents. In FIG. 2B, prompting of the user to enter authentication information occurs by way of a user's computer workstation, step 142, as will be later described relative to FIG. 15. In this context, a user is representatively working on an application at their workstation and is trying to manipulate certain imaging functions, such as color palettes, and sends their print or imaging job to the imaging device from the application. Still alternatively, FIG. 2C shows a more complicated option. That is, this option allows the user to access multiple functions while only logging-in once. For instance, when a user attempts to use a function of the imaging device, it is determined whether the user has recently been authorized, such as within an amount of time set by the device's administrator, step 143. If so, the earlier authorization information remains valid and the imaging function is executed without requiring re-authorization, step 144. If not, the user is again prompted for authorization information through steps 141 or 142.

Figure 3A:
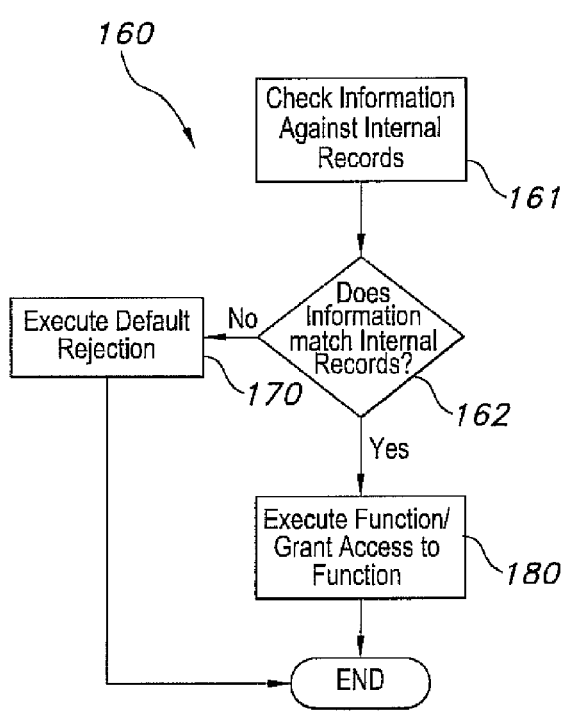
FIGS. 3A and 3B are flow charts in accordance with the teachings of the present invention for determining if the authorization information entered by the user is valid.
Figure 3B:
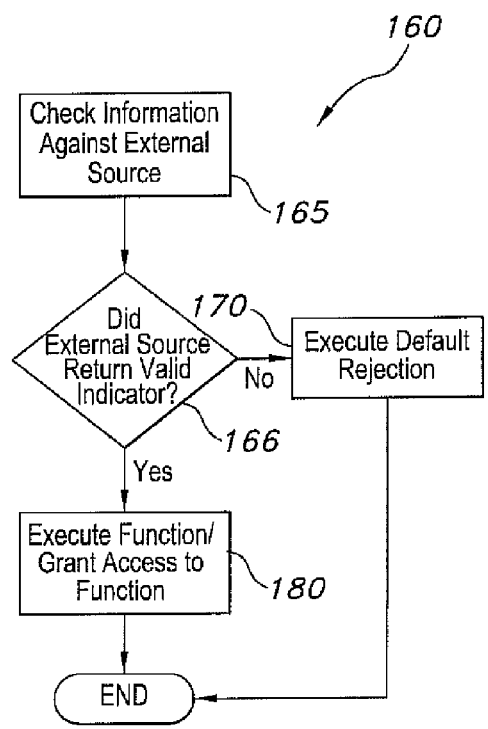

In FIGS. 3A and 3B, representative methods 160 are shown for determining whether information provided by the user is valid. In FIG. 3A, the authorization information provided by the user is checked against various internal records, step 161. Depending upon whether it matches the internal records, step 162, processing proceeds to either of steps 170 or 180 as before. This scenario is most likely used for simple security measures such as verifying PINs, passwords or other credentials. In FIG. 3B, the authorization information provided by the users is checked against various external sources, step 165. Depending upon whether it matches the external sources, step 166, processing proceeds to either of steps 170 or 180 as before. This scenario is most likely undertaken when the security protocol requires a central source for authorization information. Such security protocols include LDAP and Kerberos, FBI fingerprint verification, etc.

Figure 4:
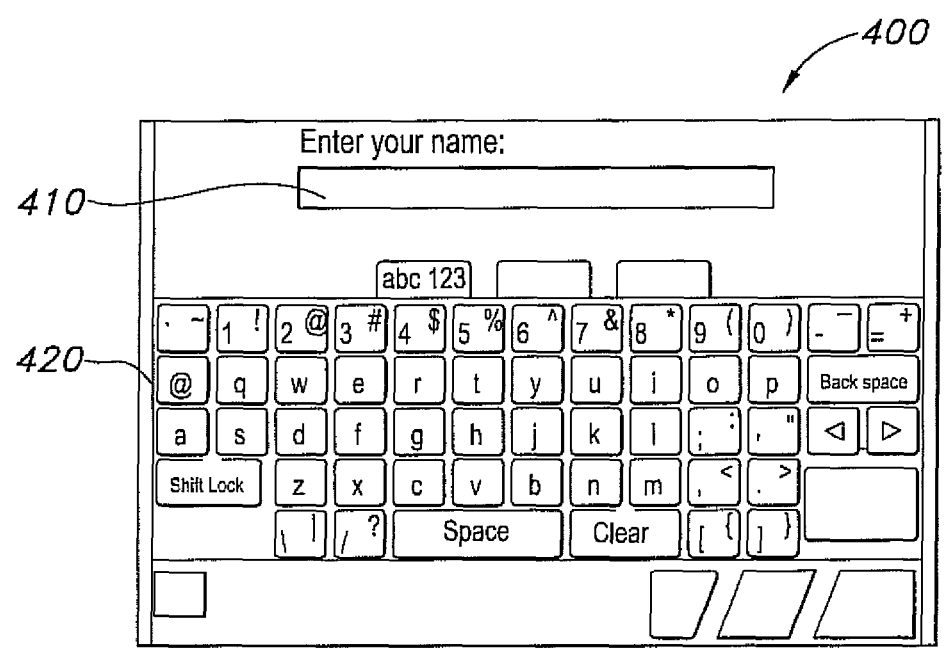
FIG. 4 is a screenshot view in accordance with the teachings of the present invention of a possible design of an entry panel on an imaging device.

FIG. 4 is a screenshot of one possible layout of an entry panel on an imaging device. This particular display utilizes a touch-screen to allow the user to enter numerals, letters, or symbols via keypad 420. The information entered would appear in textbox 410. This could be used at steps 140 and 150 of FIG. 1 for prompting the user to enter authorization information.

Figure 5:
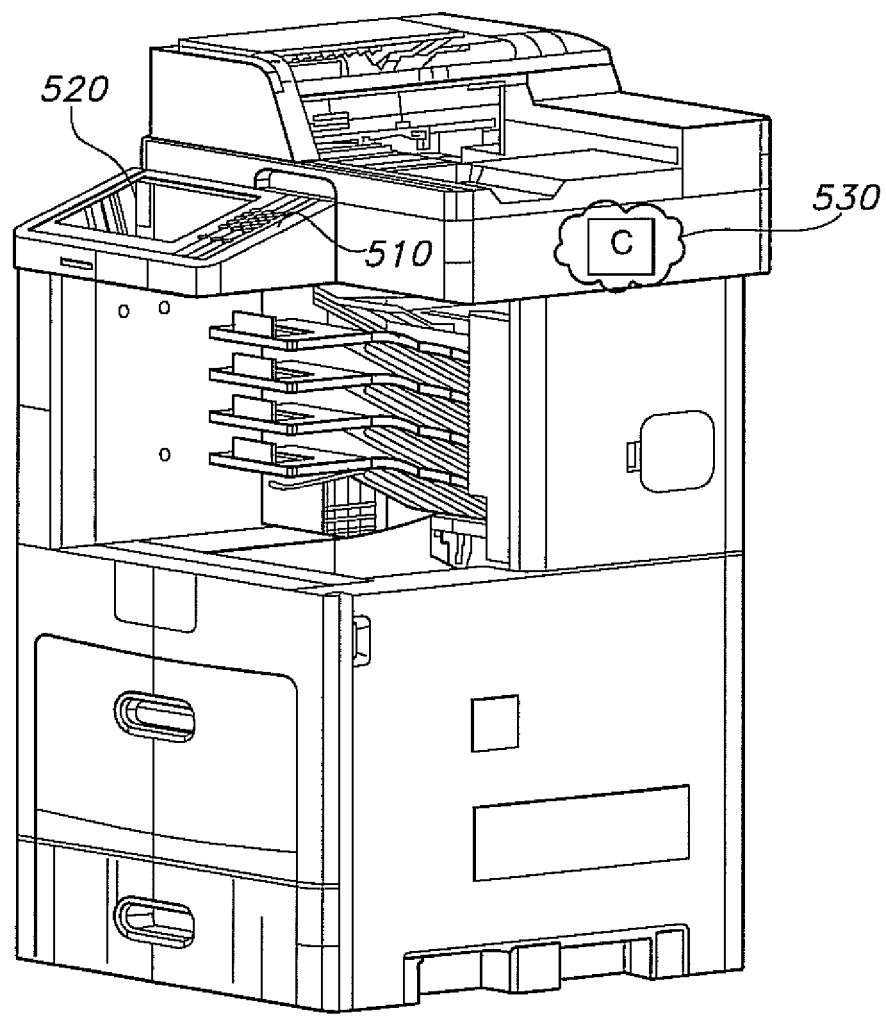
FIG. 5 is a diagrammatic view in accordance with the teachings of the present invention of a representative imaging device.

FIG. 5 is a diagrammatic view of a stereotypical imaging device employed in enterprise level environments. Reference point 520 shows the possible location of a display device that could be used to enter authorization information. Point 510 shows the possible location of a keypad which could be used to enter information for the purpose of authorization or for other functions, such as selecting the number of copies to be made. The imaging device's controller is shown at point 530. The controller controls the operation of the imaging device, and may contain computer memory for the purpose of storing software or firmware. In some instances of the invention, this is where the computer program product would be stored.

Figure 6A:
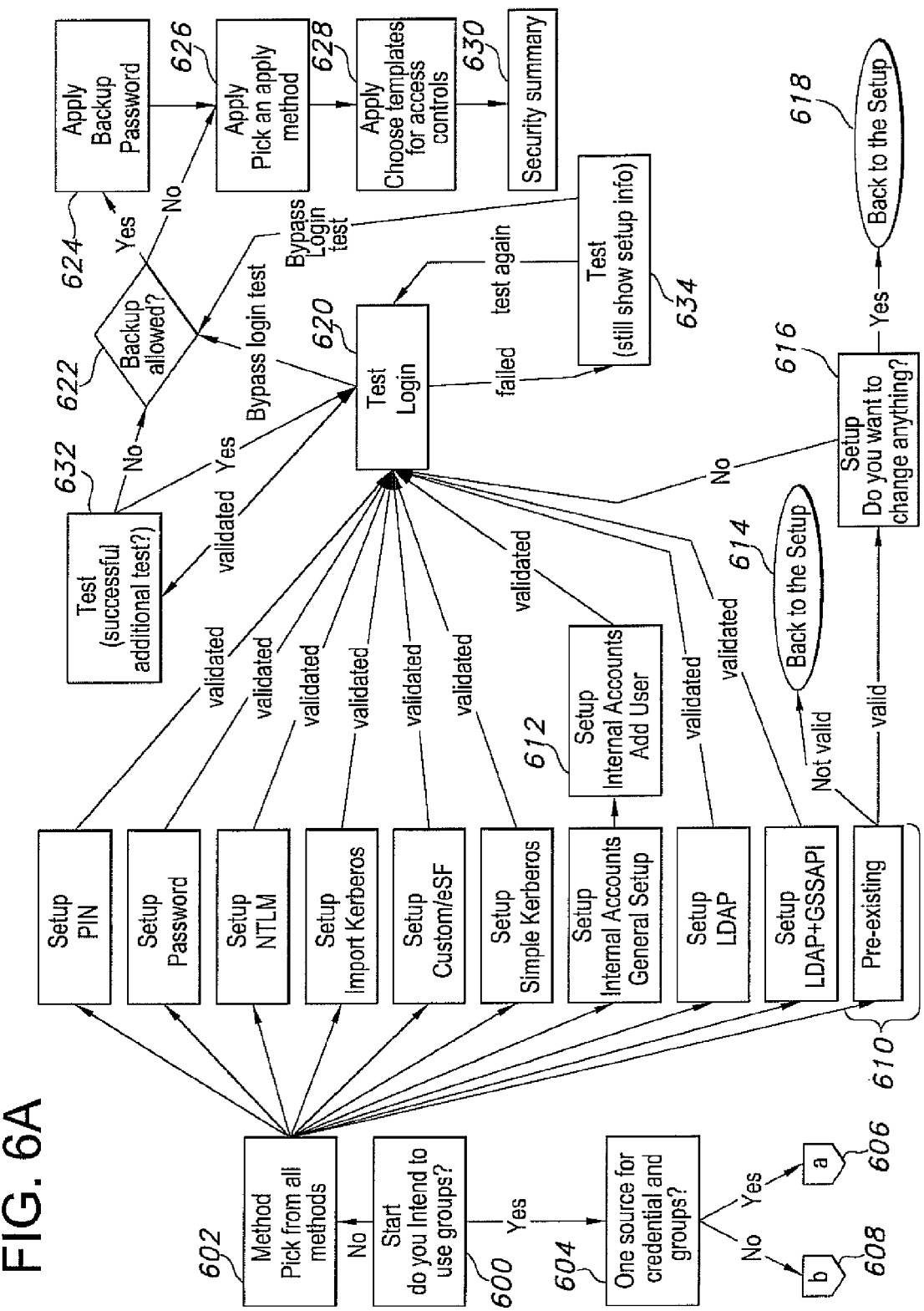
FIGS. 6A, 6B, and 6C are flow charts in accordance with the teachings of the present invention of one possible method of managing the security protocols on an imaging device.
Figure 6B:
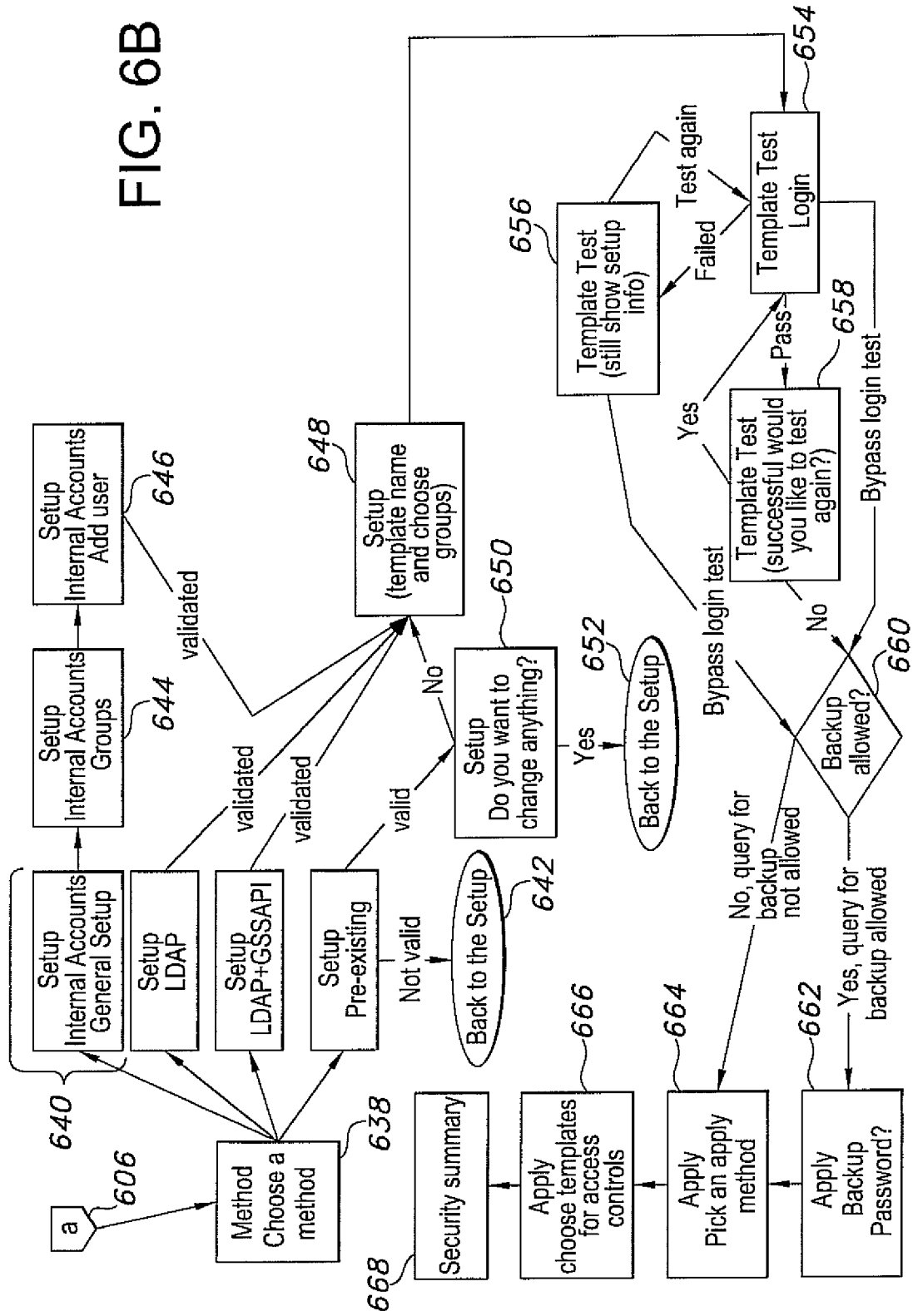
Figure 6C:
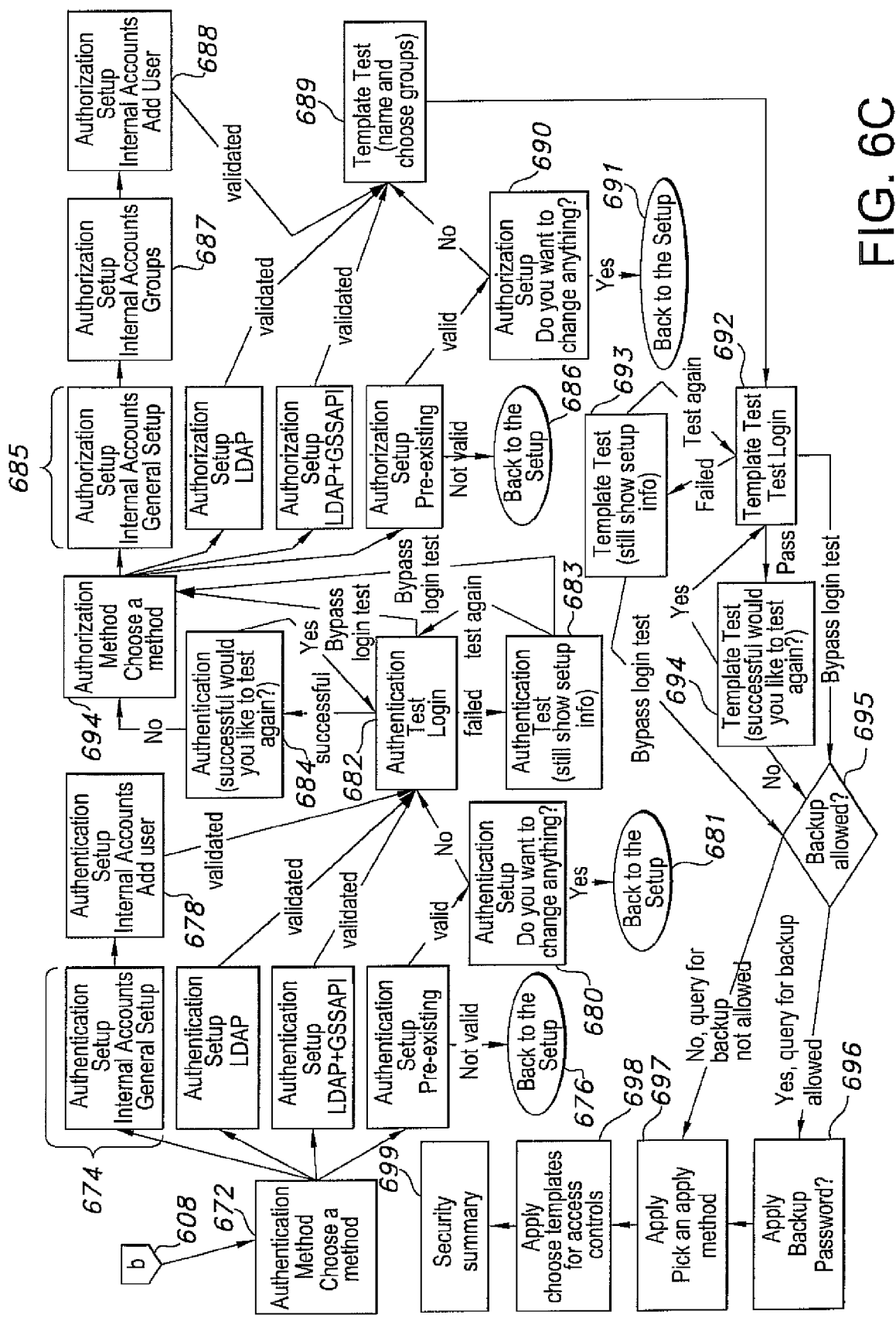

FIGS. 6A, 6B, and 6C represent the logical steps taken to configure one embodiment of the computer program product, such as would likely be done by accessing a web page hosted by a web-server located with the imaging device, although other methods are possible. The flow chart begins at point 600, where the administrator must determine whether or not to use groups. Groups, as used herein, are a form of security which allows users with similar characteristics to be given similar security privileges. It is often used because it is more efficient than setting the security privileges for each individual user. For example, all engineers may need access to print on legal sized paper; instead of setting each engineer to have access to perform this function, the system administrator could create a group which has access to printing on legal paper, and then put all the engineers into that group. Similarly, employees in a marketing department may have need of printing in full color, thus, a marketing group would consist of employees having full color access. (FIGS. 9 and 13 show both the Engineer and Marketing groups, and other groups.) Of course, skilled artisans can contemplate other groups, or workgroups. Using groups also reduces the risk of error as the security setting only has to be arranged once, and there is no risk of accidentally configuring a user with the wrong settings. Authentication, in contrast, is the process of using groups to determine if a user can access a function.

If groups are not chosen, the configuration proceeds to point 602, where the administrator chooses one of the security protocols provided at point 610. In this embodiment, these protocols could be changed by the addition or removal of specific modules, which contain the information about the security protocol, from the program. Once a protocol is chosen, the selection is validated, and possibly more information would be required, e.g., 612 (Adding users), 614 (back to setup, if invalid), 616 (enter changes and back to setup 618). At point 620, the administrator can perform a Test Login. From this point, there are three options: the login test is successful (point 632), the login test failed (point 634), or it was bypassed (point 622). The administrator then has the option to set a few option features, such as setting a backup password. The only remaining step for non-group security is to set the specific functions which the security protocol will apply, shown at point 628. At this step, the administrator can modify the security of all functions, and then view a summary of the new security protocol at point 630.

Back to the start at 600, however, if the administrator had chosen to use a group security policy at point 602, he would then have the option to use one source or multiple sources for the group credentials at point 604. If a single source is chosen, logic proceeds to FIG. 6B through point 606. At point 638, the administrator is asked to choose a group protocol, and proceed to point 640, where various setups are undertaken, e.g., LDAP, LDAP plus GSSAPI, a preexisting setup, etc. The computer program only lists those security protocols which are compatible with using groups. Once any necessary information is entered, e.g., 644 and 646, the administrator will have reached point 648, including an option of entering changes 650 and/or proceeding back to the setup 652. The administrator can then proceed to point 660 with the option to test the group template for operability, e.g., steps 654, 656, 658. From here, the administrator can create a backup password (point 662) or move on to assigning the security protocol to specific functions of the imaging device (point 666), before viewing a security summary (point 668).

Had the administrator chosen to use multiple sources for the group protocol at point 604 (FIG. 6A), he would have proceeded to FIG. 6C through point 608. Points 672 through 681 are essentially the same as points 638 through 652 on FIG. 6B, except these steps deal with user authentication. This sets up the method used to determine if the user is who he says he is. These steps are repeated in points 684 through 689, but for user authorization. Authorization then determines if the user has rights to access the requested function. Points 692 through 699 follow the same logic as points 654 through 668 on FIG. 6B.

FIGS. 7 through 14 are a series of screenshots showing some steps of one implementation of the process shown in FIGS. 6A, 6B, and 6C, by clicking on links that advance the process from one page to the next. These particular screenshots are web pages. FIG. 7 shows the initial screen, 700, allowing an administrator to set up a new security protocol, referred to here as "building blocks." In order to select a security protocol, the system administrator must select any one of the listed security protocols, at point 710. The administrator could also assemble a security template (point 720) or apply a template to access controls (point 730).

FIG. 8 shows screen 800 for managing various instances of a chosen building block, in this case LDAP+GSSAPI, from FIG. 7. An administrator can add a new instance of the protocol, at point 810. If the administrator wants to edit an existing implementation of the security protocol, he can do so by selecting point 820.

FIG. 9 shows screen 900 for creating a new building block, specifically LDAP+GSSAPI. The administrator must enter the required information for the implementation of the protocol. In the instance shown, the administrator must enter a name (point 910) and location (point 920). Other options may also be required (point 930). If groups are being used, as they are here, the group names may be entered as well (point 940).

FIG. 10 shows another screen, 1000, for creating a new building block, this time for a simple password. Here, this instance of the protocol would be named at point 1010. The password would be entered at point 1020, and re-entered at 1030. A preset administrator's password can be set to work with this instance at point 1040. When the administrator is finished, button 1050 is selected.

Figure 11:
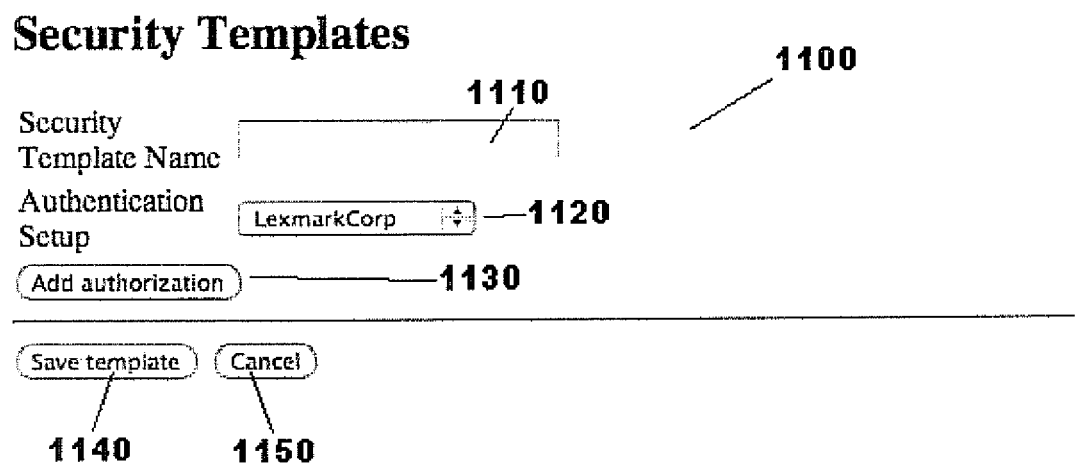

FIG. 11 shows screen 1100, the first step of setting up group authorization, labeled here as a "Security Template." The template's name is entered into textbox 1110. The authentication setup can be selected from drop-down menu 1120. If the administrator is satisfied with the information, he may click button 1130. If he wants to finish the process later, he may select button 1140, or press button 1150 to cancel the process.

FIG. 12 shows screen 1200, the result of pressing the "Add authorization" button from FIG. 11. It shows the name entered in textbox 1110 and the authentication setup chosen in drop-down menu 1120 from FIG. 11. The administrator must choose the authorization setup from drop-down menu 1210. This is done on a separate screen to minimize improper configurations, by allowing the system to choose which authorization setup options fit with authentication setup chosen in FIG. 11. The administrator can then set the group at button 1220. He could also choose to save the template to finish it at a later time (button 1230) or cancel the process (button 1240).

FIG. 13 shows a screen 1300 allowing the administrator to select which groups are authorized to access the imaging device. The administrator must select any necessary groups from list box 1310. He can then save the template by selecting button 1320 or canceling the process by selecting button 1330.

FIG. 14 shows the screen 1400 for selecting which imaging functions require which security protocols. The administrator sees a list of functions which can be restricted (point 1410). Each option has an associated drop-down menu containing the names of the security protocols which have been created, as well as the options to disable a feature completely and to apply no security protocol at all. Here, drop-down menu 1420 shows that a user can only access the security menus remotely if satisfying the "UsersIn [Group] NOC" setting. Meanwhile, drop-down menu 1430 shows that anyone may access the paper menu at the device. Drop-down menu 1440 shows that the function allowing the language to be changed has been completely disabled. Drop down menu 1450 shows that only a system administrator can lock the operator panel (e.g., FIG. 4).

Figure 15:
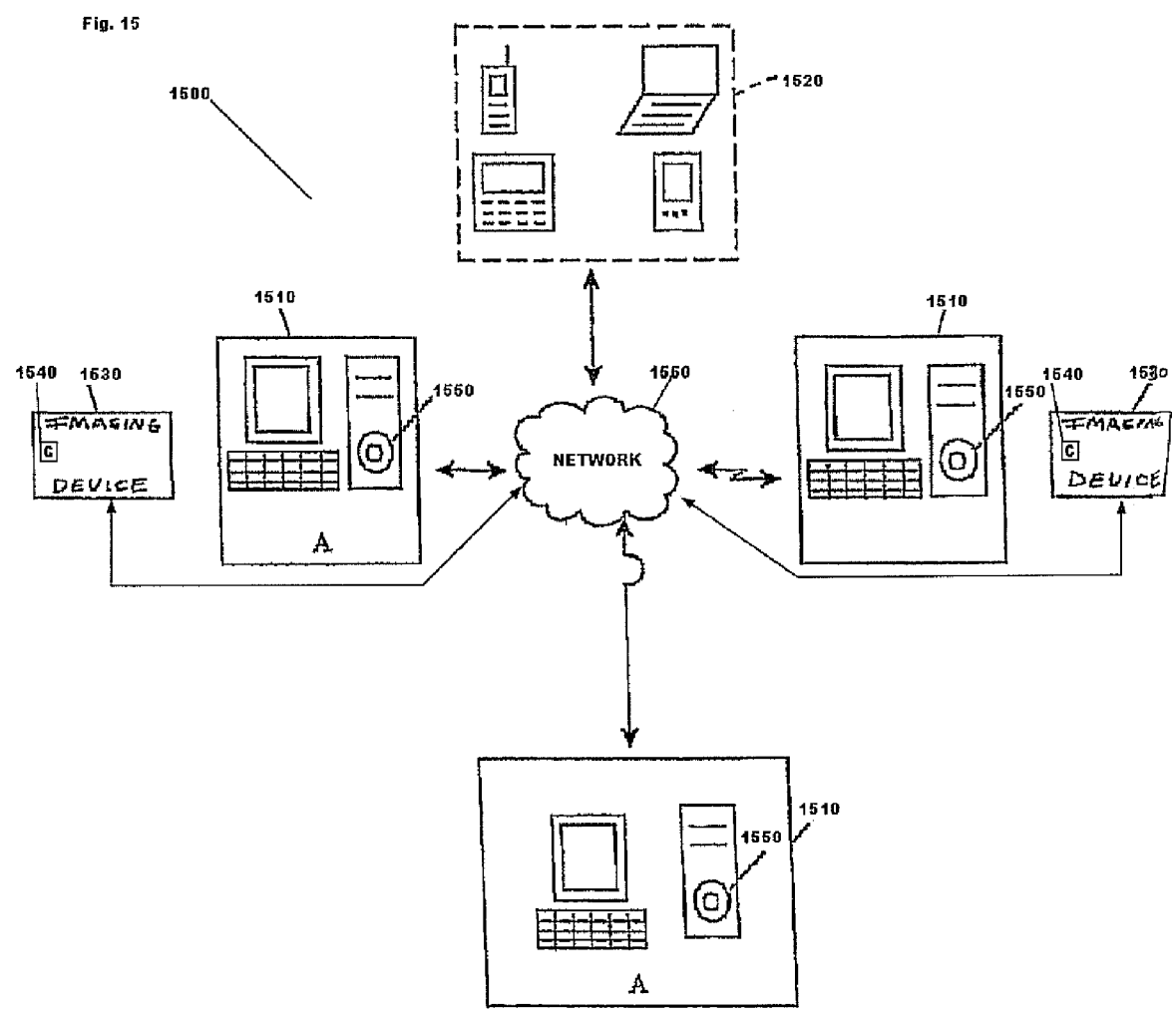
FIG. 15 is a diagrammatic view in accordance with the teachings of the present invention of a typical computing environment in network form to take advantage of one or more aspects of the invention.

Finally, FIG. 15 shows a typical network 1500. There are several workstations (1510), as well as other devices (1520) connected to the network. In addition, there are two imaging devices connected to the network at point 1530. Each imaging device also contains a controller (e.g., 530, FIG. 5), shown at point 1540. In the representative embodiment, the computer program product would be stored on firmware acting as the controller. The computer program could be installed on the controller using means including, but not limited to, installation when the imaging device was manufactured, by installing on a computer readable media through media reader 1550 on a workstation, or by downloading from the network 1560.

With the foregoing in mind, skilled artisans will readily contemplate additional functionality. For example, information technology (IT) or other system administrator-type personnel of an enterprise may incorporate newly developed security methods such as biometric security into the computer program. They might also adapt the program to cover new functionality of imaging devices, which have yet to be developed.

Certain advantages of the invention over the prior art should now be readily apparent. For example, an imaging device can now be secured more efficiently as particular functions can have an appropriate level of security directly applied, instead of dealing with a "one size fits all" security mentality. Also, the stated problems of the prior art are overcome by features of the invention that: 1) increase the flexibility of securing an imaging device by allowing different security protocols to protect different functions of an imaging device, or to disable those functions completely (as described in FIG. 14); 2) allows the use of group structures and other forms of security (as described, for example, in FIGS. 6A, 6B, and 6C); and/or 3) includes the ability to add new security protocols through updating the computer program.

Finally, one of ordinary skill in the art will recognize that still further embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures. The present invention is not limited except as by the appended claims.

What is claimed:

1. A method of managing multiple security protocols and users of an imaging device, comprising:

receiving a user request to use a desired imaging function of a plurality of imaging functions of the imaging device;

determining whether the desired imaging function requires user authorization or authentication information;

upon a negative determination, granting access to the desired imaging function without requesting said user authorization or authentication information;

upon affirmative determination, determining a type of said user authorization or authentication information and requesting same;

receiving said determined type of said user authorization or authentication information;

determining whether the received said user authorization or authentication information is valid;

if valid, executing the desired imaging function, otherwise preventing imaging or executing a default imaging option; and arranging the users into a plurality of workgroups, comprising arranging the users such that users in each workgroup have at least one common imaging function need and selecting for each workgroup an applicable security protocol from a plurality of security protocols such that users in each workgroup have a certain applicable security protocol.

2. The method of claim 1, wherein the determining whether the received said user authorization or authentication information is valid further includes determining whether a user has already provided authenticating or authorizing information per an existing imaging session.

3. The method of claim 1, further including arranging the plurality of imaging functions in a page for setup by a system administrator, the plurality of imaging functions each having a corresponding security protocol selectable on the page independently of a selection of a security protocol for other imaging functions.

4. The method of claim 1, wherein the determining whether the received said user authorization or authentication information is valid further includes checking the received said user authorization or authentication information against an external source of data.

5. The method of claim 1, wherein the determining whether the received said user authorization or authentication information is valid further includes checking the received said user authorization or authentication information against a source of data locally accessible by the imaging device.

6. The method of claim 1, further including prompting a user at a client workstation connected to the imaging device or directly at the imaging device for said user authorization or authentication information.

7. A method of managing multiple security protocols and users of an imaging device, comprising:
provided an imaging device with a plurality of imaging functions;
arranging the plurality of imaging functions for setup by a system administrator, the plurality of imaging functions each having a plurality of security protocols from which a security protocol for the imaging function is selectable, and selecting a security protocol for each imaging function from the plurality of security protocols independently of a security protocol selected for other imaging functions;
determining whether a desired imaging function of the plurality of imaging functions requires user authorization or authentication information;
upon a negative determination, granting access to the desired imaging function without requesting said user authorization or authentication information;
upon affirmative determination, determining whether received said user authorization or authentication information is valid;
if valid, executing the desired imaging function according to the corresponding security protocol or the plurality of security protocols; and
providing the system administrator with a capability to arrange the users into a plurality of workgroups according to the plurality of imaging functions, comprising arranging the users in each workgroup based on at least one common imaging function need.

8. The method of claim 7, wherein the determining whether the received said user authorization or authentication information is valid further includes determining whether a user has already provided authenticating or authorizing information per an existing imaging session.

9. The method of claim 7, wherein the plurality of security protocols are combined to protect a single of the plurality of imaging functions.

10. The method of claim 7, wherein the received said user authorization or authentication information is invalid, preventing imaging or executing a default imaging option.

11. The method of claim 7, wherein the determining whether the received said user authorization or authentication information is valid further includes checking the received said user authorization or authentication information against an external or internal source of data relative to the imaging device.

12. An imaging device for imaging a to-be-imaged media, comprising:
a plurality of imaging functions for imaging the to-be-imaged media;
a panel for communicating with a user;
a connection for assembly with a computing network; and
a controller configured to be setup by a system administrator via the computing network or panel to arrange each of the plurality of imaging functions with a corresponding security protocol that is selectable from a plurality of security protocols independently of the security protocol selected for other of the imaging functions, and to arrange users into a plurality of workgroups according to the plurality of imaging functions, the controller also configured to determine whether a desired imaging function of the plurality of imaging functions requires user authorization or authentication information wherein, if required, the controller is locally or remotely able to determine whether received said user authorization or authentication information is valid and to thereafter image the to-be-imaged media according to the desired imaging function according to the corresponding security protocol, wherein the controller is further configured to cause display of web pages via the computing network so a system administrator can setup the workgroups and the security protocols.

13. The imaging device of claim 12, wherein the panel is a touch screen configured to receive said user authorization information.

14. The imaging device of claim 12, further including a local memory connected to the controller to locally verify whether said user authorization or authentication information is valid.

15. The imaging device of claim 12, further including a computer program product available on a computer readable media or as a download having executable instructions for configuring the controller.

16. The imaging device of claim 15, wherein the executable instructions are further able to cause comparison of the received said user authorization or authentication information to locally or remotely stored records.

17. The imaging device of claim 12, wherein the controller is further configured for preventing imaging or executing a default imaging option of the to-be-imaged media whenever the received said user authorization information is invalid.

* * * * *